United States Patent
Bryant (10) Patent No.: US 11,122,780 B2
(45) Date of Patent: Sep. 21, 2021

(54) APIARY SYSTEM AND METHOD OF USE

(71) Applicant: Carson A. Bryant, Sugarland, TX (US)

(72) Inventor: Carson A. Bryant, Sugarland, TX (US)

( * ) Notice: Subject to any disclaimer, the term of this patent is extended or adjusted under 35 U.S.C. 154(b) by 431 days.

(21) Appl. No.: 16/153,962

(22) Filed: Oct. 8, 2018

(65) Prior Publication Data

US 2019/0110446 A1 Apr. 18, 2019

Related U.S. Application Data

(60) Provisional application No. 62/571,356, filed on Oct. 12, 2017.

(51) Int. Cl.
*A01K 47/06* (2006.01)
*B66F 3/00* (2006.01)

(52) U.S. Cl.
CPC .............. *A01K 47/06* (2013.01); *B66F 3/005* (2013.01)

(58) Field of Classification Search
CPC ................................. A01K 47/00; A01K 47/06
USPC .............. 449/26, 50, 3; 248/346.01, 346.03; 114/264, 266, 265, 267; 441/129
See application file for complete search history.

(56) References Cited

U.S. PATENT DOCUMENTS

| | | | | |
|---|---|---|---|---|
| 289,683 A * | 12/1883 | Meyer | ................... | A01K 53/00 449/10 |
| 1,768,041 A * | 6/1930 | Fenno | ................... | A01K 47/00 449/16 |
| 2,036,113 A * | 3/1936 | Befera | ................... | A47B 43/00 248/163.1 |
| 2,081,084 A * | 5/1937 | Bohnet | ................... | A01K 47/06 449/15 |
| 2,162,413 A * | 6/1939 | Wisniewski | ........... | A01K 57/00 449/20 |
| 2,292,110 A * | 8/1942 | Evans | ................... | A01K 47/00 449/14 |
| 2,326,250 A * | 8/1943 | O'Beirne | ............... | A01K 47/00 449/6 |
| 3,791,080 A * | 2/1974 | Sjoberg | ................. | E04B 1/3412 52/79.4 |
| 4,034,518 A * | 7/1977 | Trecker | .................... | A45C 9/00 5/114 |
| 4,938,629 A * | 7/1990 | Boudrias | ................... | E02B 3/06 114/263 |
| 5,628,671 A * | 5/1997 | Stevens | ................ | A01K 67/033 449/14 |
| 5,911,542 A * | 6/1999 | Obrock | ................... | B63B 35/38 405/219 |
| 5,993,288 A * | 11/1999 | Shmuelli | ................ | A01K 47/06 449/26 |
| 6,089,176 A * | 7/2000 | Costello | ................. | B63B 35/34 114/263 |

(Continued)

*Primary Examiner* — Magdalena Topolski
*Assistant Examiner* — Shada Mohamed Alghailani
(74) *Attorney, Agent, or Firm* — Leavitt Eldredge Law Firm (57) ABSTRACT

An apiary system includes a platform having a top surface on which one or more beehives are secured, the platform having a floatation device incorporated into the platform; one or more anchoring poles inserted into the ground, the one or more anchoring poles engage with the platform such that the platform can rise and lower along an axis of the one or more anchoring poles; the platform rises above rising water via the one or more anchoring poles.

9 Claims, 10 Drawing Sheets

(56) References Cited

U.S. PATENT DOCUMENTS

| | | | | |
|---|---|---|---|---|
| 6,171,160 B1* | 1/2001 | Skaggs | B63B 22/24 | 441/129 |
| 6,273,016 B1* | 8/2001 | Gibbs | B63B 21/00 | 114/230.1 |
| 6,347,487 B1* | 2/2002 | Davis | E04H 9/145 | 52/1 |
| 6,409,431 B1* | 6/2002 | Lynch | B63B 43/00 | 114/263 |
| 6,648,554 B1* | 11/2003 | Sehl | B63B 21/50 | 114/351 |
| 7,793,466 B2* | 9/2010 | de Cherance | E02D 27/36 | 52/64 |
| 7,850,398 B2* | 12/2010 | Foo | E02B 17/0021 | 405/212 |
| 7,921,604 B2* | 4/2011 | Lino | E04H 9/14 | 52/1 |
| 8,523,491 B2* | 9/2013 | Brinkmann | E02B 17/0017 | 405/203 |
| 8,702,461 B1* | 4/2014 | d'Offay | B63B 35/58 | 441/40 |
| 8,926,223 B1* | 1/2015 | DeStefano | E02D 27/32 | 405/196 |
| 9,399,878 B2* | 7/2016 | Henderson | E02D 27/52 | |
| 9,644,365 B1* | 5/2017 | DeStefano | E04G 21/163 | |
| 10,081,962 B1* | 9/2018 | Sluss | E02D 27/06 | |
| 2002/0176747 A1* | 11/2002 | Hanna | B63B 21/502 | 405/224 |
| 2006/0029470 A1* | 2/2006 | Berlin | E02B 3/26 | 405/4 |
| 2006/0086305 A1* | 4/2006 | Merchant | B63B 35/4413 | 114/265 |
| 2011/0039465 A1* | 2/2011 | Harrison | B63B 34/50 | 441/130 |
| 2012/0048169 A1* | 3/2012 | Linares | B63B 7/082 | 114/266 |
| 2012/0090525 A1* | 4/2012 | Montgomery | E02B 3/064 | 114/267 |
| 2013/0109275 A1* | 5/2013 | Jackson | A01K 47/00 | 449/16 |
| 2014/0346824 A1* | 11/2014 | Harrison | B63B 35/58 | 297/219.1 |
| 2015/0247333 A1* | 9/2015 | Padtsialezhnikau | E04H 9/145 | 114/265 |
| 2016/0096598 A1* | 4/2016 | Harkrider | B63B 7/08 | 441/130 |

* cited by examiner

APIARY SYSTEM AND METHOD OF USE

BACKGROUND

1. Field of the Invention

The present invention relates generally to apiculture, and more specifically, to an apiary system for protecting bees and their hive, particularly from rising water.

2. Description of Related Art

Figure 1:
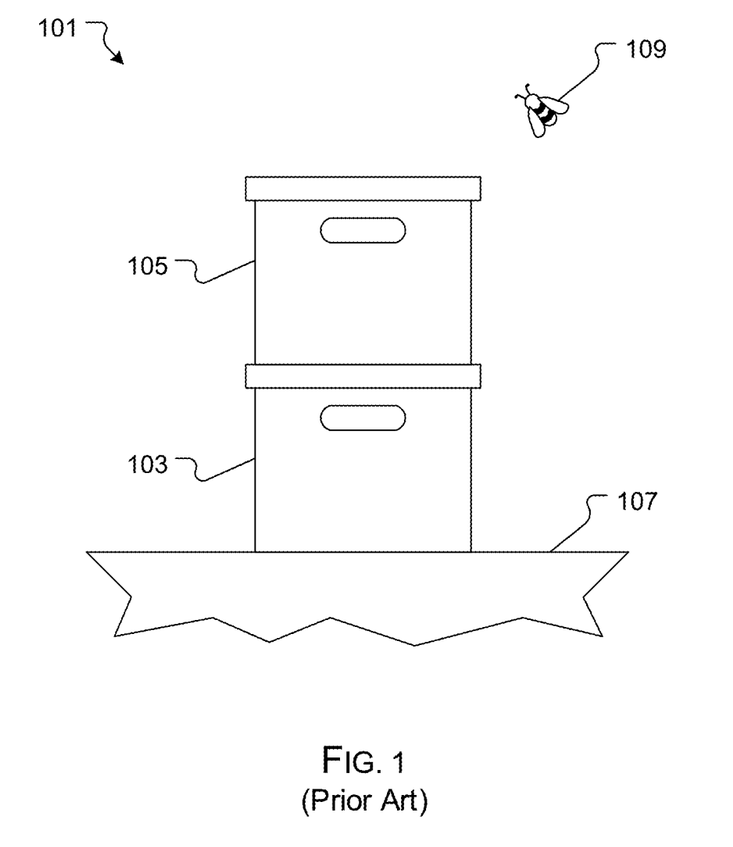
FIG. 1 is a front view of a common beehive stack.

Apiculture is well known in the art and are effective means to raise bees for the purpose of collecting honey and other products of a hive. For example, FIG. 1 depicts a conventional beehive stack 101 having a lower hive 103 resting on the ground 107 and an upper hive 105 resting on the lower hive 103. During use, bees 109 dwell in the hives 103, 105 and form honey and raise their young.

One of the problems commonly associated with system 101 is limited use. For example, the hives 103, 105 are placed on the ground 107 for ease of access to collect the honey as a result hives 103, 105 are susceptible to loss or damage from flooding and rising water.

In addition, once the bees 109 create the honey the hives 103, 105 can be heavy, at times weighing up to 250 lbs. This creates the need to harvest the honey on location or to have multiple people to move the hives 103, 105.

Accordingly, although great strides have been made in the area of apiculture, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional beehives. Specifically, the invention of the present application protects the beehives from pests, predators and flood damage. Additionally, the invention provides means of moving the hives with ease. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
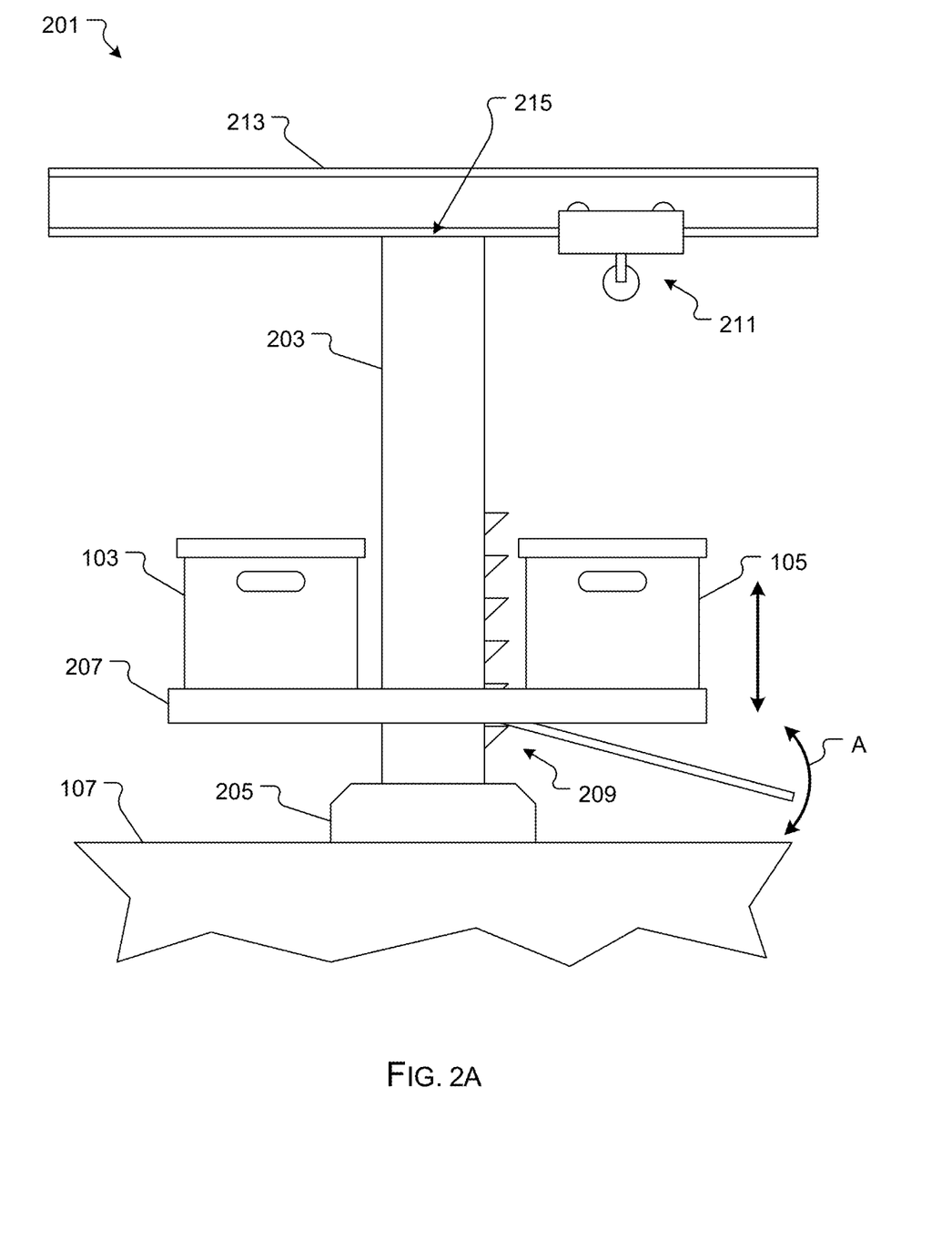
FIGS. 2A and 2B are front views of an apiary system in accordance with a first embodiment of the present application.
Figure 2B:
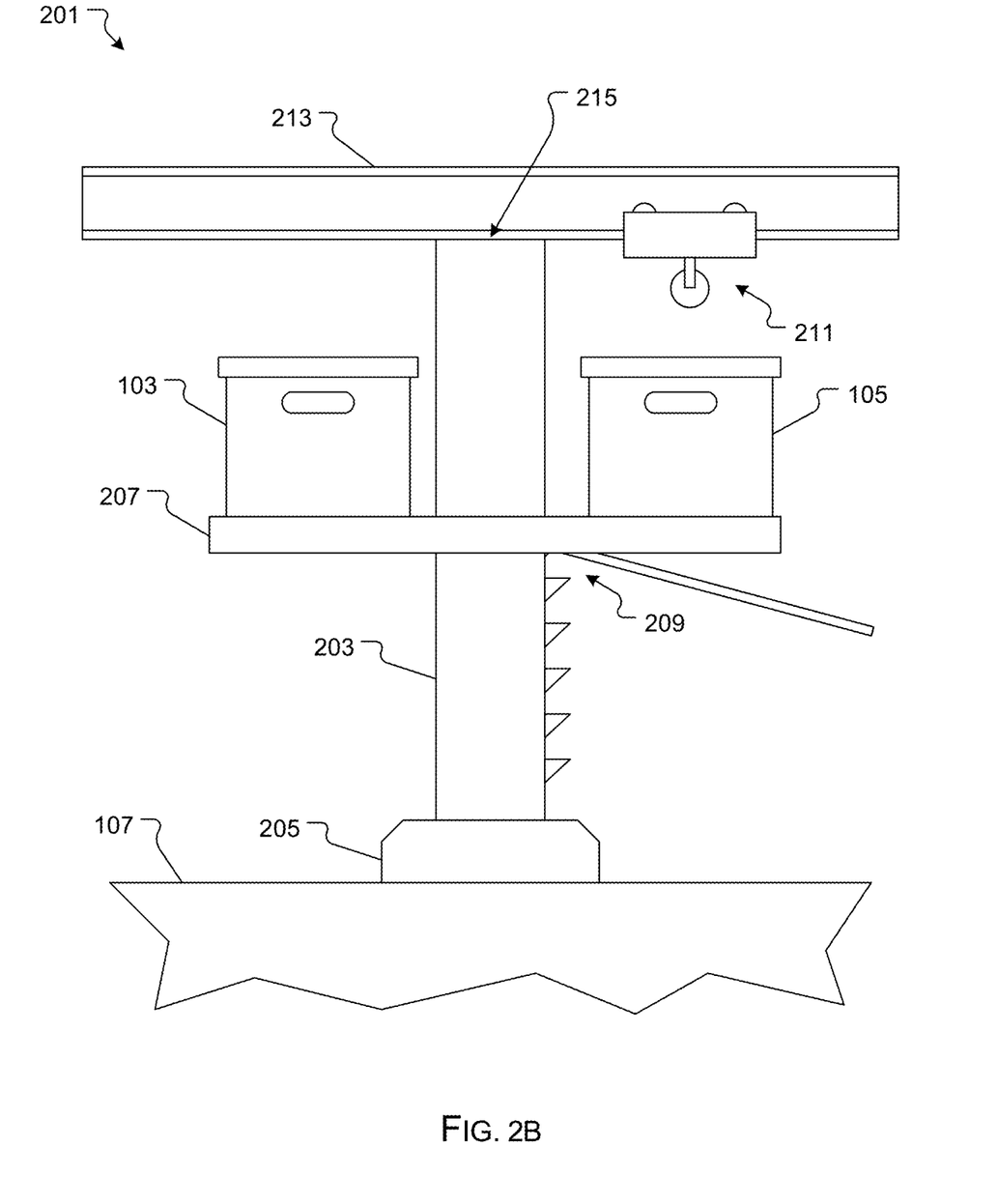

Referring now to the drawings wherein like reference characters identify corresponding or similar elements throughout the several views, FIGS. 2A and 2B depict front views of an apiary system in accordance with a preferred embodiment of the present application. It will be appreciated that system 201 overcomes one of more of the above-listed problems commonly associated with conventional beehives.

In the contemplated embodiment, system 201 includes a pole 203 affixed to the ground 107 via an anchor 205. The anchor 205 is depicted as a concrete footing. Moveably attached to the pole 203 is a platform 207. The pole 203 passing through a hole 315 (see FIG. 3) of platform 207. It should be appreciated that in the preferred embodiment, multiple poles are used, however, for simplicity, only one is shown in the figures.

The platform 207 is configured to hold and support beehives 103, 105. The platform 207 is raised or lowered with respect to the ground 107 by means of a ratcheting device 209 as depicted by motions A and B.

Rotationally attached to the top 215 of the pole 203 is a beam 213 configured to allow a hoist trolley 211 to traverse its length.

It should be appreciated that one of the unique features believed characteristic of the present application is that platform 207 is free to move up and down with respect to the ground 107 via the ratcheting device 209.

Another unique feature believed characteristic of the present application is that beam 213 and hoist 211 facilitate the movement of the beehives 103, 105 without excessive work from a user. It will be understood that ropes, straps, cables or the like will be used with the hoist 211 to move the beehives 103, 105 as is common in the art.

Figure 3:
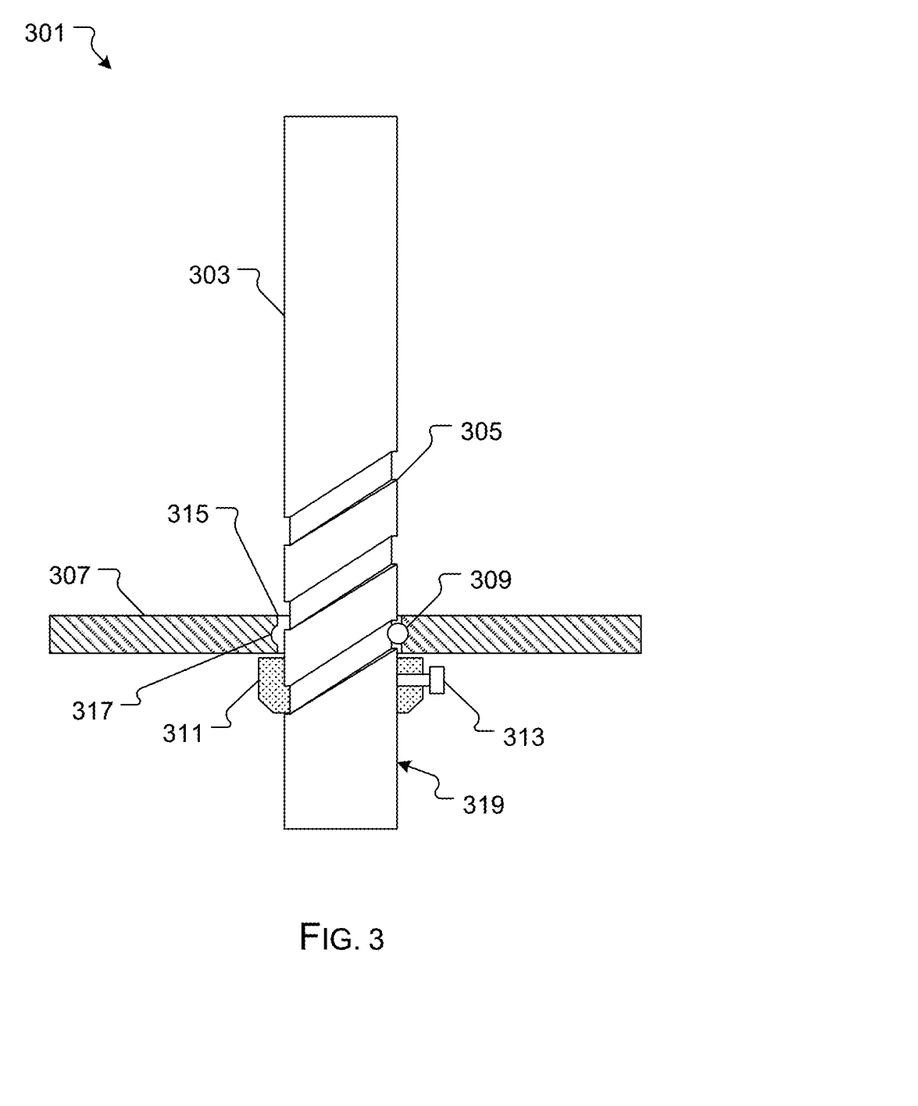
FIG. 3 is a cross-sectional front view of an alternative embodiment of the lifting apparatus of FIGS. 2A and 2B.

It will be appreciated and understood that while a ratcheting device 209 has been given as an illustration any means of raising or lowering the platform 207 along the pole 203 is contemplated. Referring now to FIG. 3 an alternative embodiment of the ratcheting device 209 is depicted. Embodiment 301 including a pole 303 with threads 305 permanently attached. A platform 307 with a hole 315 is movably and rotationally attached to the pole 303 via a groove 317 in the inside of the hole 315 and ball bearings 309. The ball bearings 309 fitting between the threads 305 and groove 317. It will be appreciated that in this fashion a user is able to raise or lower the platform 307 by rotating the platform 307. Platform 307 is held in place by a collar 311 and a bolt 313. The bolt 313 being tightened against the pole 303 preventing the platform 307 from descending. It will also be appreciated that the outer surface 319 of pole 303 could have a coating that prevents insects, pests or predators from climbing the pole 303. This could be low-friction material, pesticides or the like. It is further contemplated that pulleys, the hoist trolley or the like could also be used to raise and lower the platform 207, 307.

Figure 4:
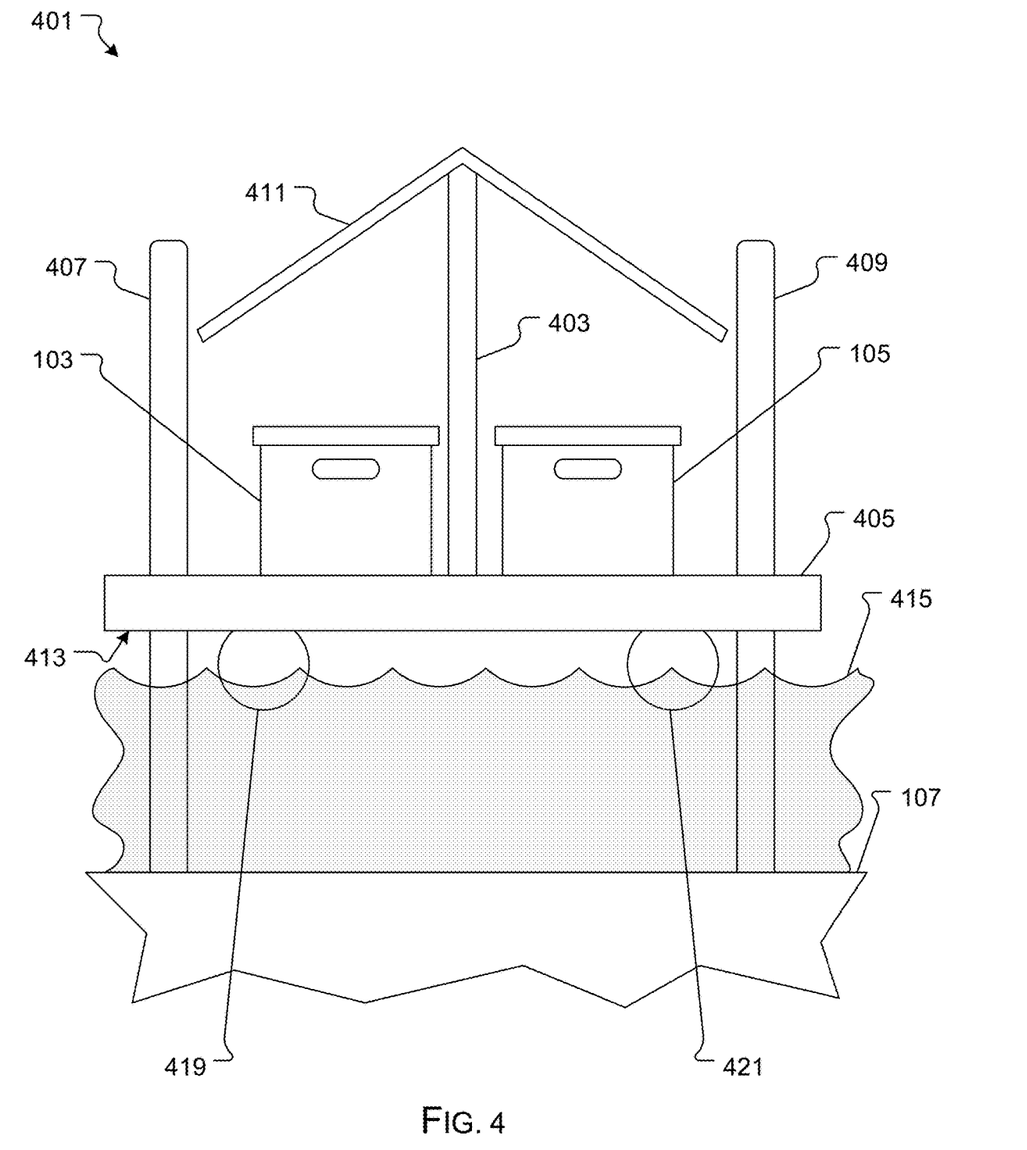
FIG. 4 is a front view of an alternative embodiment of the system of FIGS. 2A and 2B.

Referring now to FIG. 4 an alternative embodiment of system 201 is depicted. Embodiment 401 including a support 403 rigidly attached to a platform 405 at one end and supporting a roof 411 at the other end. The embodiment 401 being configured to allow beehives 103, 105 to rest on the platform 405 and under the roof 411. The platform 405 being attached to poles 407, 409 via holes. The platform 405 being free to move up and down with respect to the ground 107. The platform 405 having floatation devices 419, 421 attached to the bottom 413. The poles 407, 409 being attached to the ground 107. It will be appreciate that when water 415 arrives the floatation devices 419, 421 cause the platform 405 to rise with the top of the water 415. The floatation devices could be air or foam filled chambers to provide floatation.

Figure 5:
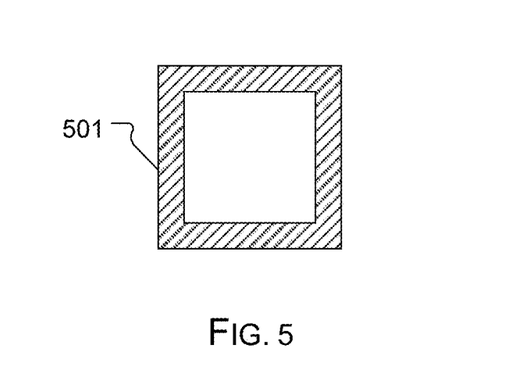
FIGS. 5, 6 and 7 are cross-sectional top views of alternative embodiments of the pole of FIGS. 2A, 2B and 4.
Figure 6:
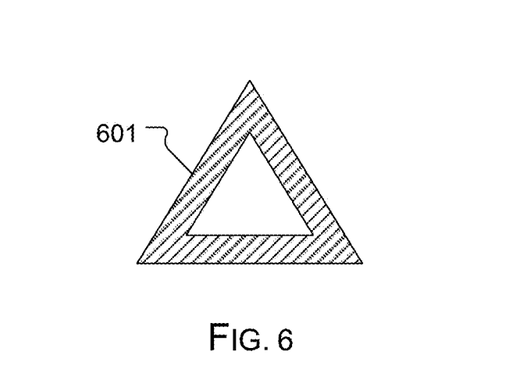
Figure 7:
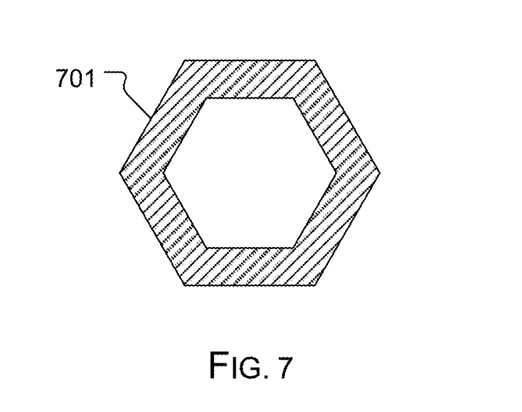

It will be appreciate that poles 203, 303 419, 421 could be of any shape or configuration to allow the platform 207, 307, 405 to rise or fall. It will be appreciated that when a single pole 203 is used the shape of the pole 203 being non circular would prevent the platform from spinning and reduce stress on the means used to raise or lower the platform 203. As depicted in FIGS. 5, 6, and 7 a rectangular 501 shape, triangular 601 shape and hexagonal 701 shape respectively are presented. It should also be appreciated that bearings, coatings or the like could be used to reduce the friction between the pole 203, 303, 419, 421 and the platform 207, 307, 405.

Figure 8A:
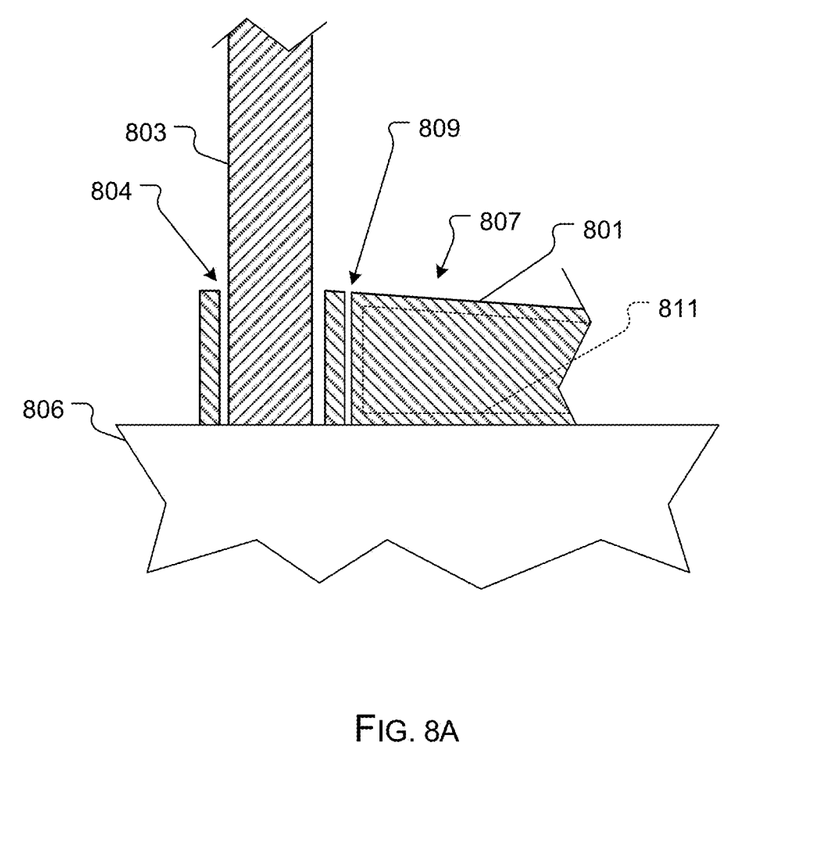
FIGS. 8A and 8B are side views demonstrating one embodiment of the engagement of the platform with a pole.
Figure 8B:
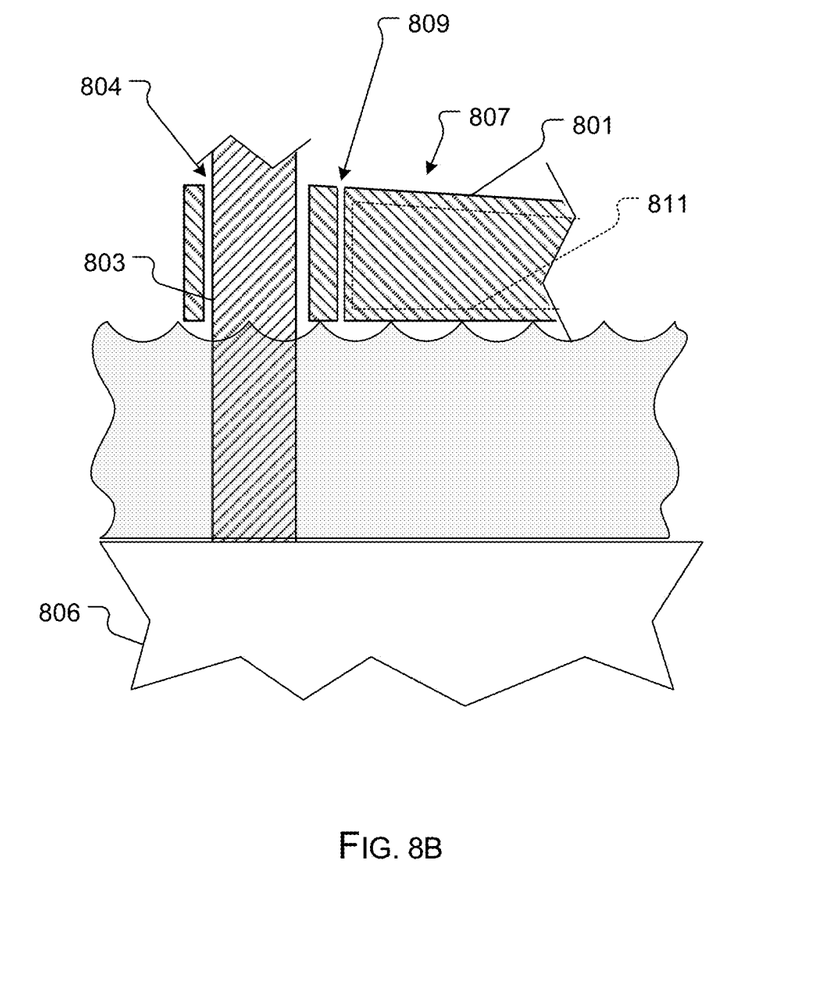

In FIGS. 8A and 8B, side cross sectional views depict movement of a platform 801 along an anchoring pole 803. As shown, the platform 801 secures to the pole, wherein gaps 804 are created to allow for the platform to rise as water rises. It should be appreciated that the anchoring pole 803 can be screwed into the ground, or can be secured via post holes dug into the ground 806. As further shown in FIGS. 8A and 8B, the platform 801 can include a slanted top surface 807 and one or more drain holes 809, thereby allowing for water to run off the platform and/or through the platform to keep the hive and bees dry. Further, as shown, the platform 801 itself can house a floatation device 811. For example, the platform could be molded out of plastics or composites so that there would be one or more hollow chambers incorporated therein.

Figure 9:
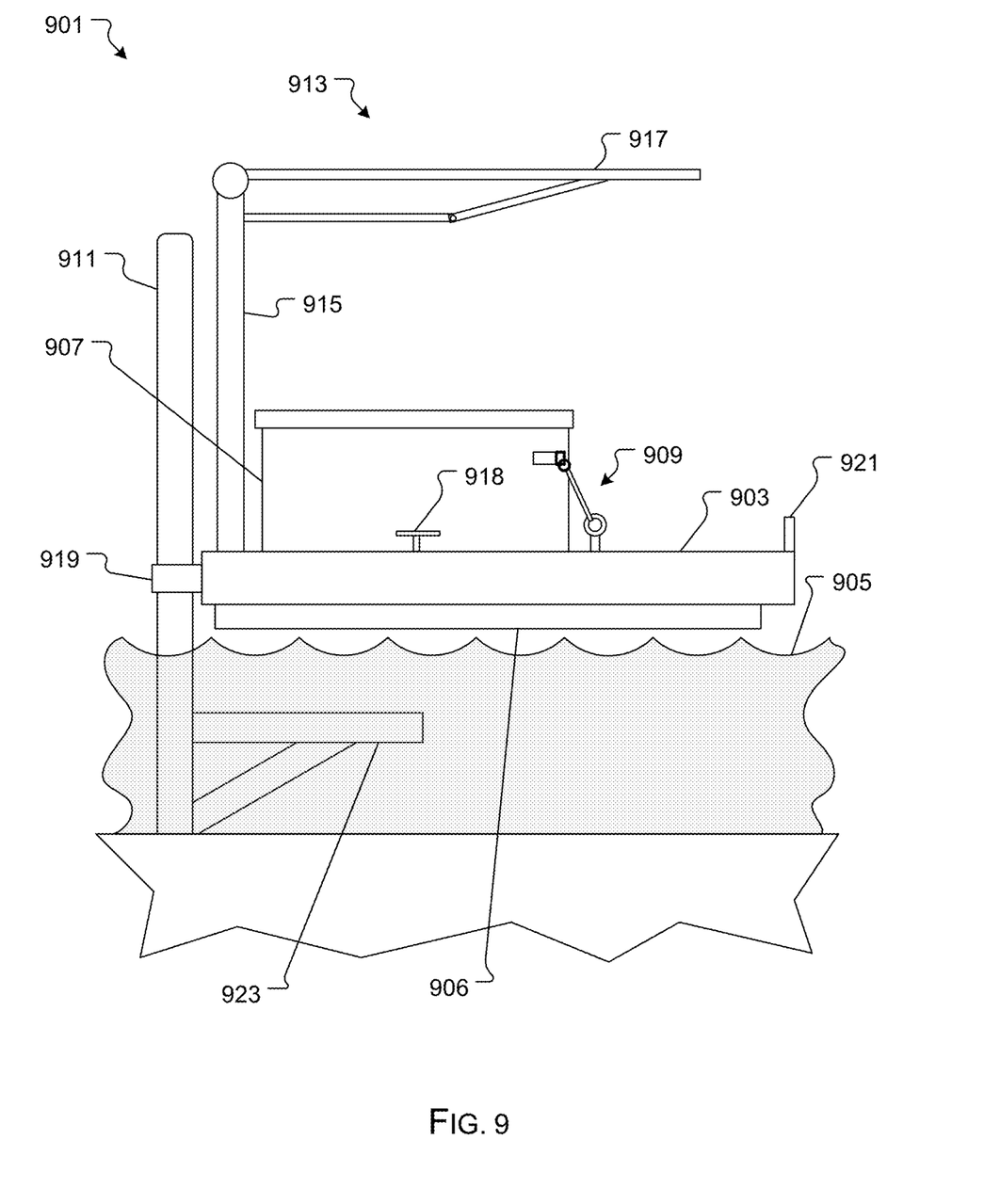
FIG. 9 is a side view depicting an alternative embodiment of an apiary system in accordance with the preset application.

In FIG. 9, a side view of an alternative embodiment 901, wherein the platform is configured to float on a ground surface 903 when water 905 rises (due to rain fall and the like) is shown. System 901 includes a platform 903 with a floatation device 906 as discussed above, secured thereto. Platform 903 holds one or more hives 907, which can be tethered to the platform via a tethering system 909. It is contemplated that the tethering system could include one or more snaps, clasps, ropes, chains, or the like, being configured to hold the hive thereon securely as the platform rises or lowers. In some embodiments, the platform further includes an additional cleat 918 or the like, which provides for anchoring via rope, chain or the like to tie down the hives, such as during a storm. In this embodiment, one or more anchoring poles 911 are loosely engaged with the platform 903 via one or more couplers 919 to provide for lift as the water 905 rises. It should be appreciated that the systems discussed herein, preferably include at least two poles for stability, however, it is contemplated that more or less poles could be used.

System 901 further includes a cover system 913 having one or more vertical supports 915 with a retractable awning/umbrella 917 configured to protect the hives 907 from weather. Further, as shown, system 901 can include a front shelf 921 to prevent sliding off from the platform of the one or more beehives. It should be appreciated that this feature is further beneficial for use with the slanted platform discussed above.

In some embodiments, a brace 923 is positioned to support platform 903 when in a lowered position, above the ground surface. In this embodiment, the platform 903 would rise above the brace, and lower back down to it when water drops. In yet additional embodiments, not shown, the system could include additional front anchoring poles for support.

Figure 10:
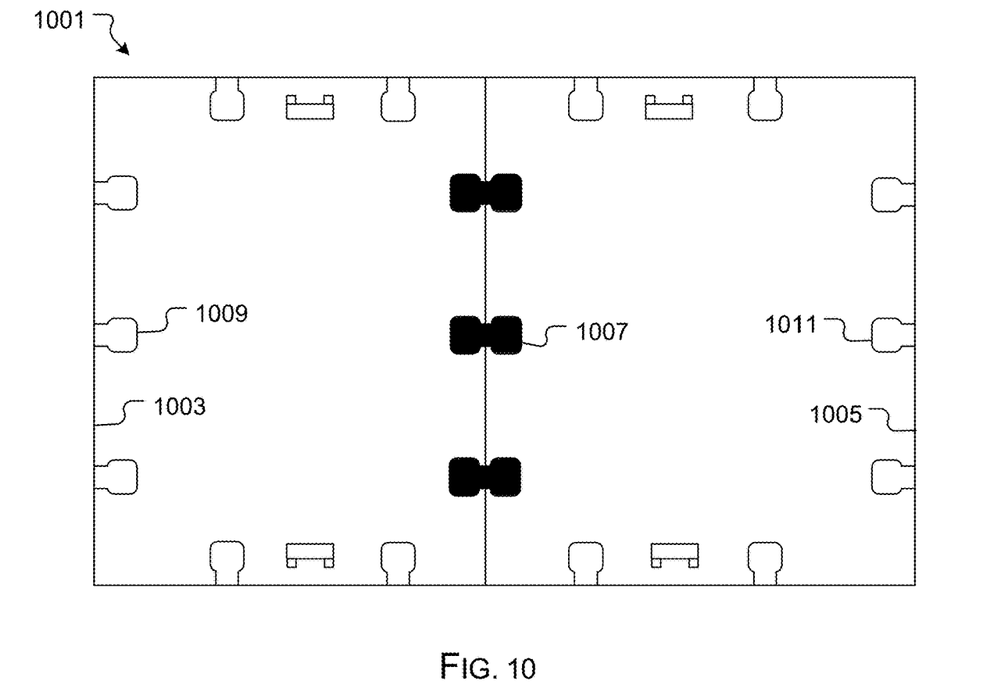
FIG. 10 is a top view of a modular platform in accordance with an embodiment of the present application.
Figure 11:
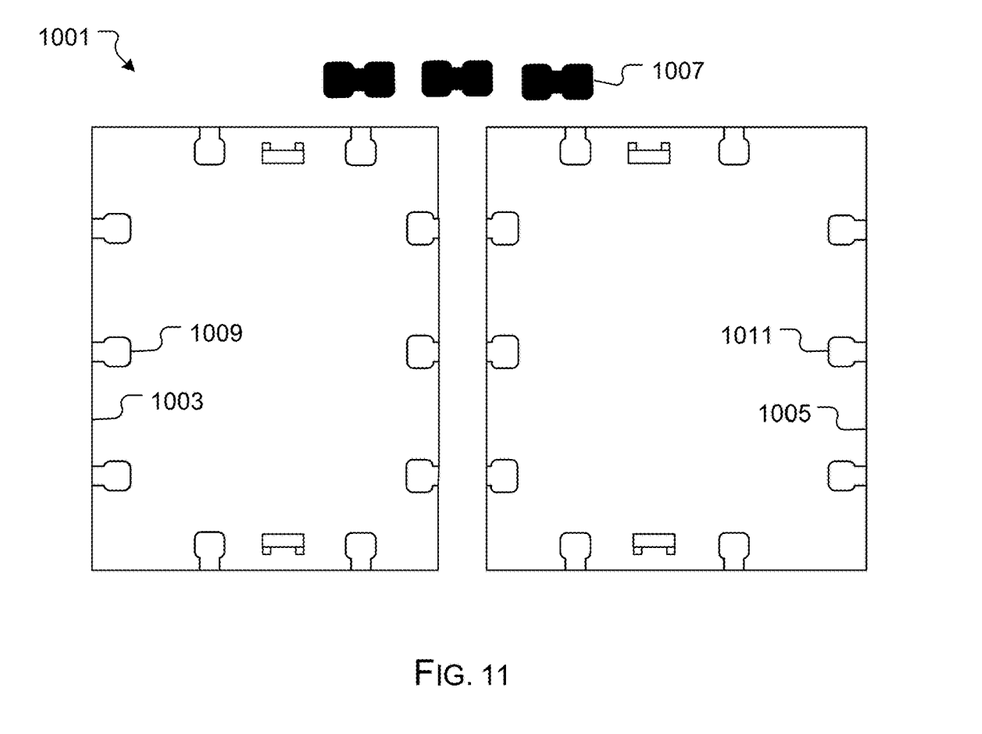
FIG. 11 is a top view of the modular platform of FIG. 10.

In FIGS. 10 and 11, top views of a modular platform 1001 are shown. It should be appreciated that a modular style platform 1001 can be used with any of the embodiments above, and includes one or more sections 1003, 1005 having connectors 1007 configured to secure the sections 1003, 1005 together. In this particular embodiment, the connectors 1007 are configured to secure within notches 1009, 1011, to hold the two sections together. Particularly, these figures show them connected in the middle. It should be appreciated that the platform can therefore be expanded to hold more hives as desired. Further, it should be appreciated that screws, bolts, brackets, clamps, or any other means could be used in alternative forms.

It should be appreciated that the systems discussed herein are representative, and the features of each figure and/or system could be incorporated to alternative systems for adaptation to fit a particular aesthetical, manufacturing, or the like reason.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. An apiary system comprising:
    a platform having a top surface on which one or more beehives are secured, the platform having:
        a floatation device incorporated into the platform;
        one or more anchoring poles inserted into the ground, the one or more anchoring poles engaged with the platform;
    wherein the platform rises above rising water via the one or more anchoring poles.

2. The system of claim 1, wherein the floatation device is an air filled chamber secured to the platform.

3. The system of claim 1, wherein the floatation device is a foam filled chamber secured to the platform.

4. The system of claim 1, wherein the floatation device is a chamber embedded within the platform.

5. The system of claim 1, wherein the top surface is slanted to allow water to flow off the top surface.

6. The system 1, further comprising:
    a cover system having a vertical support extending from the platform.

7. The system of claim 1, further comprising:
    one or more drain holes extending through a thickness of the platform.

8. The system of claim 1, wherein the platform further comprises:
    one or more holes extending through a thickness of the platform;
    wherein the one or more anchoring poles engages with the one or more holes loosely to allow for vertical movement of the platform.

9. The system of claim 1, wherein the platform comprises:
    two or more sections secured together via one or more connectors, thereby allowing for the platform to be expanded.

* * * * *